(12) United States Patent
Handshaw et al.

(10) Patent No.: US 12,026,578 B2
(45) Date of Patent: Jul. 2, 2024

(54) SYSTEMS AND METHODS FOR SELECTIVELY INITIATING IDENTIFICATION SESSIONS

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 59 days.

(21) Appl. No.: 16/680,147

(22) Filed: Nov. 11, 2019

(65) Prior Publication Data

US 2021/0142016 A1 May 13, 2021

(51) Int. Cl.
*G06K 7/10* (2006.01)
*G06K 7/14* (2006.01)

(52) U.S. Cl.
CPC ...... *G06K 7/10722* (2013.01); *G06K 7/10811* (2013.01); *G06K 7/10851* (2013.01); *G06K 7/10861* (2013.01); *G06K 7/10881* (2013.01); *G06K 7/1413* (2013.01); *G06K 7/1417* (2013.01)

(58) Field of Classification Search
CPC .............. G06K 7/10722; G06K 7/01722
USPC .................................................. 235/454
See application file for complete search history.

(56) References Cited

U.S. PATENT DOCUMENTS

| | | | | |
|---|---|---|---|---|
| 8,925,815 B2 * | 1/2015 | Madej | ............... | G07G 1/0045 235/440 |
| 9,213,875 B1 * | 12/2015 | Nadabar | ............... | G06K 7/1439 |
| 2011/0127335 A1 * | 6/2011 | He | ............... | G06K 7/1456 235/462.41 |

* cited by examiner

*Primary Examiner* — Rafferty D Kelly

(57) ABSTRACT

An example barcode reader includes a housing and an imaging assembly positioned at least partially within the housing. The imaging assembly has a field of view (FOV) including a first portion of the FOV and a second portion of the FOV. The imaging assembly is configured to capture one or more images of the FOV associated with image data. The barcode reader also includes a processor communicatively coupled to the imaging assembly. The processor is configured to process the image data of the first portion of the FOV and to initiate an identification session when a target enters the first portion of the FOV and configured to not initiate the identification session when the target enters the second portion of the FOV.

26 Claims, 5 Drawing Sheets

SYSTEMS AND METHODS FOR SELECTIVELY INITIATING IDENTIFICATION SESSIONS

FIELD OF THE DISCLOSURE

At least some embodiments of the present invention relate generally to scanning devices and, in particular, relates to scanning devices adapted to selectively initiate identification sessions.

BACKGROUND

Venues, such as retail stores, often use bi-optic barcode readers in the checkout process to read barcodes affixed to products being checked out. Bi-optic barcode readers are typically formed with a horizontal window and a vertical window arranged in a way that image data can be captured by internal imaging components (e.g., imaging sensors) through either of the two windows. While these bi-optic barcode readers are effective at reading barcodes, identification sessions of known barcode readers may be initiated at times when a product/barcode is not being presented.

Accordingly, there remains a demand for continued design improvements in the field of bi-optic barcode readers.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
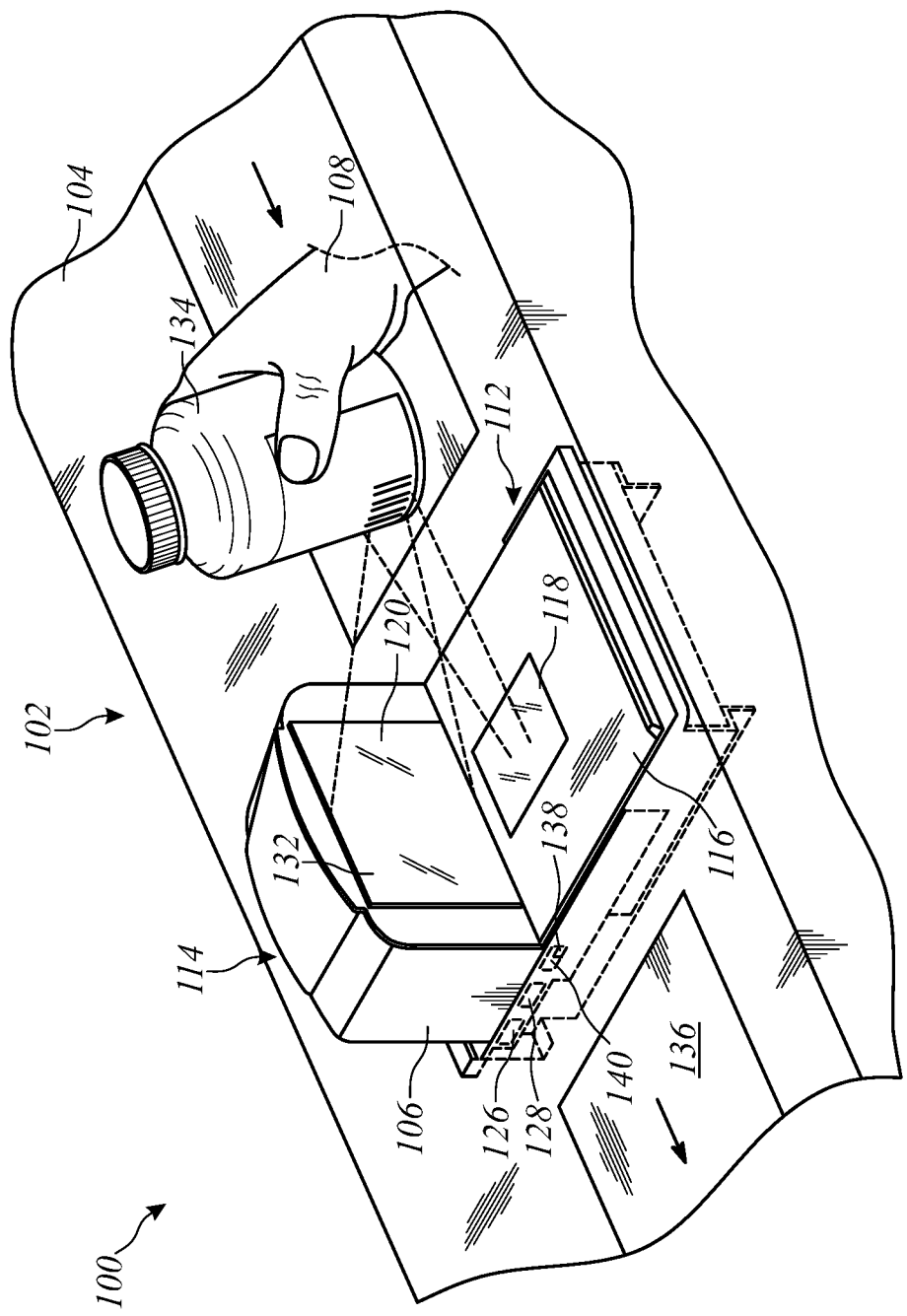
FIG. 1 illustrates a perspective view of a point-of-sale (POS) system in accordance with a first disclosed example.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

In a first example, a barcode reader includes a housing and an imaging assembly positioned at least partially within the housing. The imaging assembly has a field of view (FOV) including a first portion of the FOV and a second portion of the FOV. The imaging assembly is configured to capture one or more images of the FOV associated with image data. The barcode reader also includes a processor communicatively coupled to the imaging assembly. The processor is configured to process the image data of the first portion of the FOV and to initiate an identification session when a target enters the first portion of the FOV and is configured to not initiate the identification session when the target enters the second portion of the FOV.

In a variation of the first example, the processor is configured to process the image data of the first portion of the FOV to determine a differential brightness value, to compare the determined differential brightness value to a reference differential brightness value, and to detect the target entering the first portion of the FOV in response to the determined differential brightness value being within a threshold value of the reference differential brightness value.

In a variation of the first example, the processor is configured to compare subsequent image data of the first portion of the FOV to preceding image data of the first portion of the FOV to detect the target entering the first portion of the FOV.

In a variation of the first example, the processor is configured to process the image data of the first portion of the FOV to identify contrast within the image data and to identify the target based on the contrast.

In a second example, a scanning device assembly includes a scanning device having a housing and an imaging assembly positioned at least partially within the housing. The imaging assembly has a field of view (FOV) and is configured to capture one or more images of the FOV associated with image data. The scanning device also includes a processor communicatively coupled to the imaging assembly. The processor is configured to process the image data of a portion of the FOV and to cause the imaging assembly to initiate an identification session when a target enters the portion of the FOV.

In a variation of the second example, the processor is configured to not initiate the identification session when the target enters a second portion of the FOV. In a variation of the second example, the scanning device is a bi-optic scanner having a lower tower extending generally perpendicular to the lower housing. The imaging assembly is positioned such that the FOV fans out in at least one of a generally horizontal direction and a generally vertical direction. In another variation of the second example, the scanning device is a hand-held scanner.

In a variation of the second example, the scanning device assembly further includes a base adapted to support the scanning device during operation. In a variation of the second example, the scanning device assembly further includes a sensor carried by one of the scanning device and the base and is configured to generate a first signal when the base is supporting the scanning device and is configured to generate a second signal when the base is spaced from the scanning device. The processor is configured to cause the scanning device to be in a first operational mode in response to the processor accessing the first signal and the processor is configured to cause the scanning device to be in a second operational mode in response to the processor accessing the second signal.

In a variation of the second example, the scanning device assembly further includes a sensor carried by the scanning device and is configured to generate a first signal when the scanning device is in a first orientation and to generate a second signal when the scanning device is in a second orientation. The processor is configured to associate the portion of the FOV with a first side of the FOV in response to the processor accessing the first signal and the processor is configured to associate the portion of the FOV with a second side of the FOV in response to the processor accessing the second signal.

In a third example, a method of initiating an identification session of a barcode reader includes obtaining image data of a first portion of a field of view (FOV) of an imaging assembly. The FOV includes the first portion and a second portion. The method includes processing the image data of the first portion of the FOV to determine a differential brightness value and comparing the determined differential brightness value to a reference differential brightness value to determine if the determined differential brightness value is within a threshold value of the reference differential brightness value. The method includes in response to the determined differential brightness value being within the threshold value of the reference differential brightness value, initiating an identification session associated with a target entering the first portion of the FOV. The identification session includes capturing one or more images of the FOV.

In a variation of the third example, the method further includes not initiating the identification session when the target enters the second portion of the FOV. In a variation of the third example, obtaining the image data of the first portion of the FOV includes not obtaining the image data of a second portion of the FOV. In a variation of the third example, the method further includes causing the barcode reader to be in a presentation mode when the barcode reader is supported by a base and causing the barcode reader to be in a handheld mode when the barcode reader is spaced from the base.

FIG. 1 illustrates a perspective view of a point-of-sale (POS) system 100 in accordance with a first disclosed example. The POS system 100 includes a workstation 102 with a counter 104 and a bi-optical (also referred to as "bi-optic") barcode reader 106. The POS system 100 is often managed by a store employee such as a clerk 108. However, in other cases, the POS system 100 may be a part of a so-called self-checkout lane where instead of a clerk, a customer is responsible for checking out his or her own products.

The barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some embodiments, the top portion 116 may include a removable or a non-removable platter (e.g., a weighing platter). The top portion 116 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 116 are illustrated as being about co-planar, that does not have to be the case for the platter and the counter 104 to be considered substantially parallel. In some instances, the counter 104 may be raised or lowered relative to the top surface of the top portion 116, where the top portion 116 is still viewed as being positioned substantially parallel with the counter 104 surface. The raised housing 114 is configured to extend above the top portion 116 and includes a second optically transmissive window 120 positioned in a generally upright plane relative to the top portion 116 and/or the first window 118. Note that references to "upright" include, but are not limited to, vertical. Thus, as an example, something that is upright may deviate from a vertical axis/plane by as much as 45 degrees.

Figure 2:
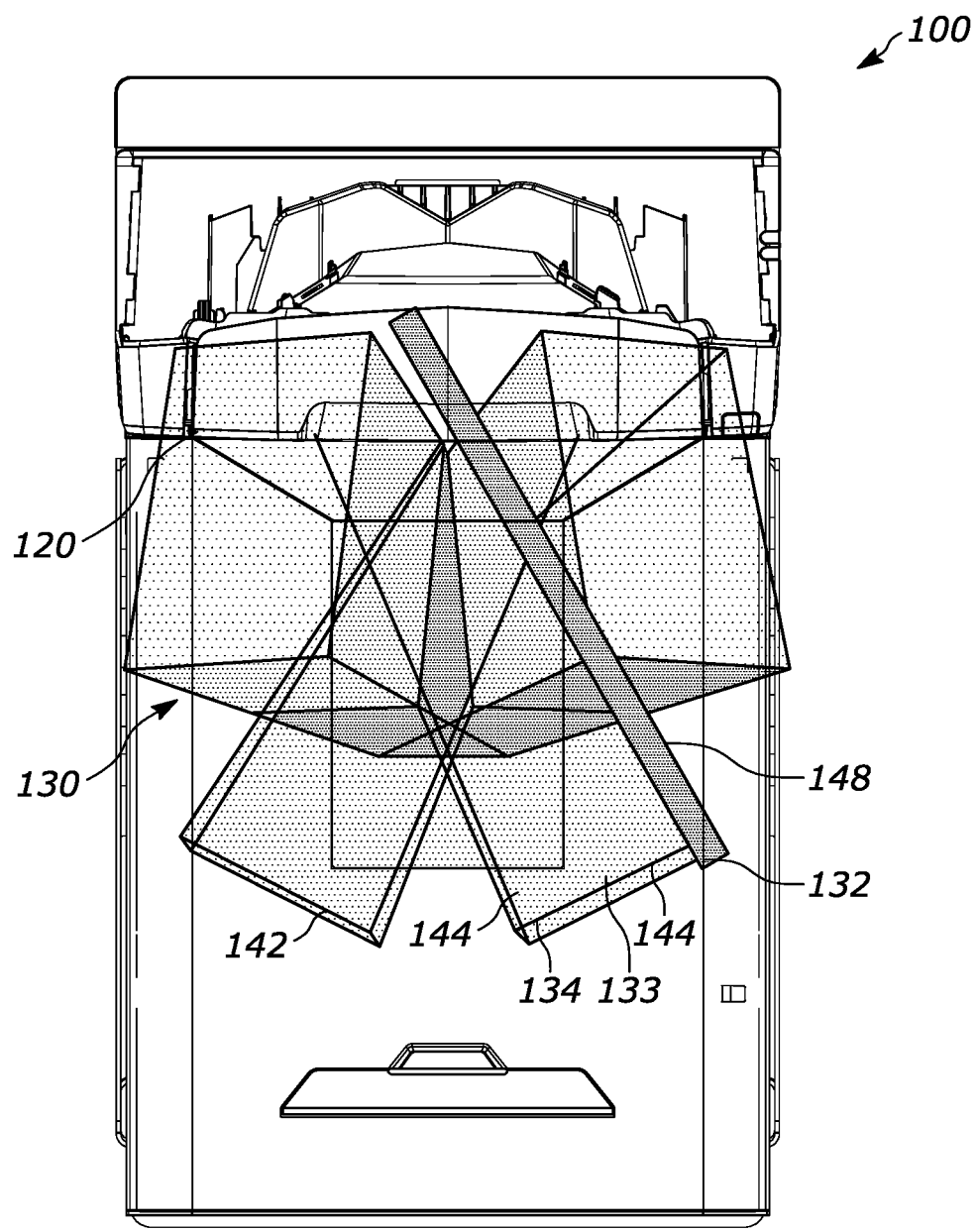
FIG. 2 illustrates a top view of the barcode reader including a field of view (FOV) that is directed through a second window of the POS system of FIG. 1.
Figure 3:
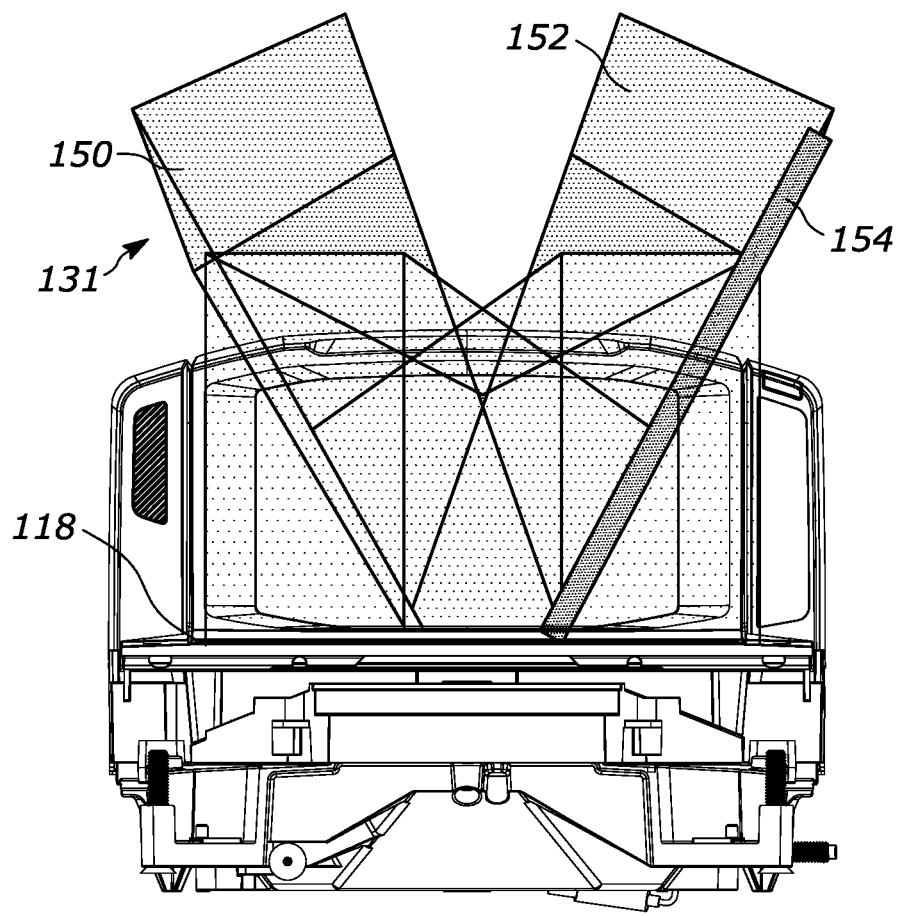
FIG. 3 illustrates a front view of the POS system of FIG. 1 including another FOV that is directed through a first window of the POS system.

In the example shown, the POS system 100 includes one or more optical imaging assemblies 126 and a processor 128. The processor 128 is communicatively coupled to the imaging assembly 126. As shown in FIGS. 2 and 3, the imaging assembly 126 has a field of view 130 and/or 131 (see, FIGS. 2, 3) and is configured to capture one or more images of the FOV 130 associated with image data.

In an example, the processor 128 of FIG. 1 is configured to process image data of a first portion 132 of the FOV 130 in FIG. 2. In the example of FIG. 2, the FOV 130 includes the first portion 132 and a second portion 133. In some examples, the first portion 132 of the FOV 130 is associated with one or more pixels in a photodetector of the POS system 100, such as a photodetector of the imaging assembly 126. The pixels in the photodetector may be positioned adjacent one another and/or the pixels may be spaced from one another. As an example, the pixels may be disposed along one side of the photodetector, i.e., the side associated with the FOV 130. In another example, the pixels may be positioned along two, opposing sides of the photodetector each corresponding to a side of the FOV 130. Other arrangements may prove suitable. The processor 128 is also configured to initiate an identification session when a target 134, such as for example a bottle, enters the first portion 132 of the FOV 130.

To deter the processor 128 from initiating an identification session when the target 134 is not entering the FOV 130 such as, for example, when products accumulate or are moved downstream 136 of the FOV 130, the processor 128 is configured to not initiate the identification session when the target 134 enters another portion (e.g., the second portion 133) of the FOV 130. As a result, the POS system 100 may not be accidently activated, thereby reducing energy consumption, reducing the likelihood of unnecessary illumination by the POS system 100, and allowing the processor 128 to decode images that are more likely to include the target 134 (or another target) in them.

In some examples, processing the image data of the portion 132 of the FOV 130 includes the processor 128 processing the image data to determine a differential brightness value. The differential brightness value may be determined from image data obtained by the imaging assembly 126 when a limited number of sensor rows are exposed with and without illumination on. The processor 128 may compare the determined differential brightness value to a reference differential brightness value 138 stored in a memory 140 of the POS system 100 to determine if the determined differential brightness value is within a threshold value of the reference differential brightness value. In some examples, the processor 128 detects the target 134 entering the first portion of 132 of the FOV 130 when the determined differential brightness value is within a threshold value of the reference differential brightness value. In response, the processor 128 may initiate the identification session during which the POS system 100 is "woken up" to begin decoding barcodes. However, other approaches may prove suitable to detect when the target 134 enters the FOV 130.

For example, the processor 128 may compare subsequent image data of the first portion 132 of the FOV 130 to preceding image data of the first portion 132 of the FOV 130 to detect the target 134 entering the first portion 132 of the FOV 130. The processor 128 may also or alternatively be configured to process the image data of the first portion 132 of the FOV 130 to identify contrast within the image data and to identify the target 134 based on the contrast.

FIG. 2 illustrates a top view of the POS system 100 including the FOV 130 that is directed through the second window 120. Thus, in the example shown, the imaging assembly 126 is positioned such that the FOV 130 fans out in a generally horizontal direction. The FOV 130 may be altered and redirected within the POS system 100 using splitter mirror(s)/fold mirror(s) into a first sub field of view 142 and a second sub field of view 144 and redirected out of the second window 120. In the example shown, the portion 132 of the FOV 130 used by the processor 128 to initiate the identification session is positioned on a side 146 of the FOV 130 and is associated with an edge 148 of the FOV 130. However, the portion 132 of the FOV 130 may be positioned in any other position. For example, the portion 132 may be centrally positioned within the FOV 130 (e.g., on an inner edge or portion of the first or second FsOVs 142, 144) or may include a majority or the entire ones of the first or second FsOVs 142, 144. Other arrangements may prove suitable.

FIG. 3 illustrates a front view of the POS system 100 including the other FOV 131 that is directed through the first window 118. Thus, in the example shown, the imaging assembly 126 is positioned such that the FOV 130 fans out in a generally vertical direction. The FOV 131 may be altered and redirected within the POS system 100 using splitter mirror(s)/fold mirror(s) into a third sub field of view 150 and a fourth sub field of view 152 and redirected out of the first window 118. In the example shown, a portion 154 of the FOV 131 may be used by the processor 128 to initiate the identification session. The portion 154 may be defined in any location in the third and/or fourth FsOV 150, 152.

In some examples, the processor 128 uses the image data associated with the portion 154 projecting through the first window 118 and the image data associated with the portion 132 projecting through the second window 120 when determining to initiate the identification session. Alternatively, the processor 128 may use the image data associated with the portion 154 projecting through the first window 118 and not use the image data associated with the portion 132 projecting through the second window 120. This approach may be advantageous when the clerk 108 is performing an action (e.g., writing) within one of the FsVO 130, 131 that may likely inadvertently cause the processor 128 to initiate an identification session. Moreover, using the vertical projecting portion 132 of the FOV 130 and not the horizontal projecting portion 154 of the FOV 131 may limit the height of events that cause the processor 128 to initiate an identification session.

The processor 128 may be configured to initiate identification sessions by the manufacturer or may be configured by the customer. In examples in which the customer configures the processor 128, the clerk 108 may scan a barcode associated with using image data from both of the portions 132, 154 or one of the portions 132, 154. Scanning such a barcode may define a location of the portion 132 and/or 154 within the respective FsVO 130, 131. For example, a first barcode may define the portion 132 on the left side of the FVO 130 and a second barcode may define the portion 132 on the right side of the FVO 130.

Figure 4:
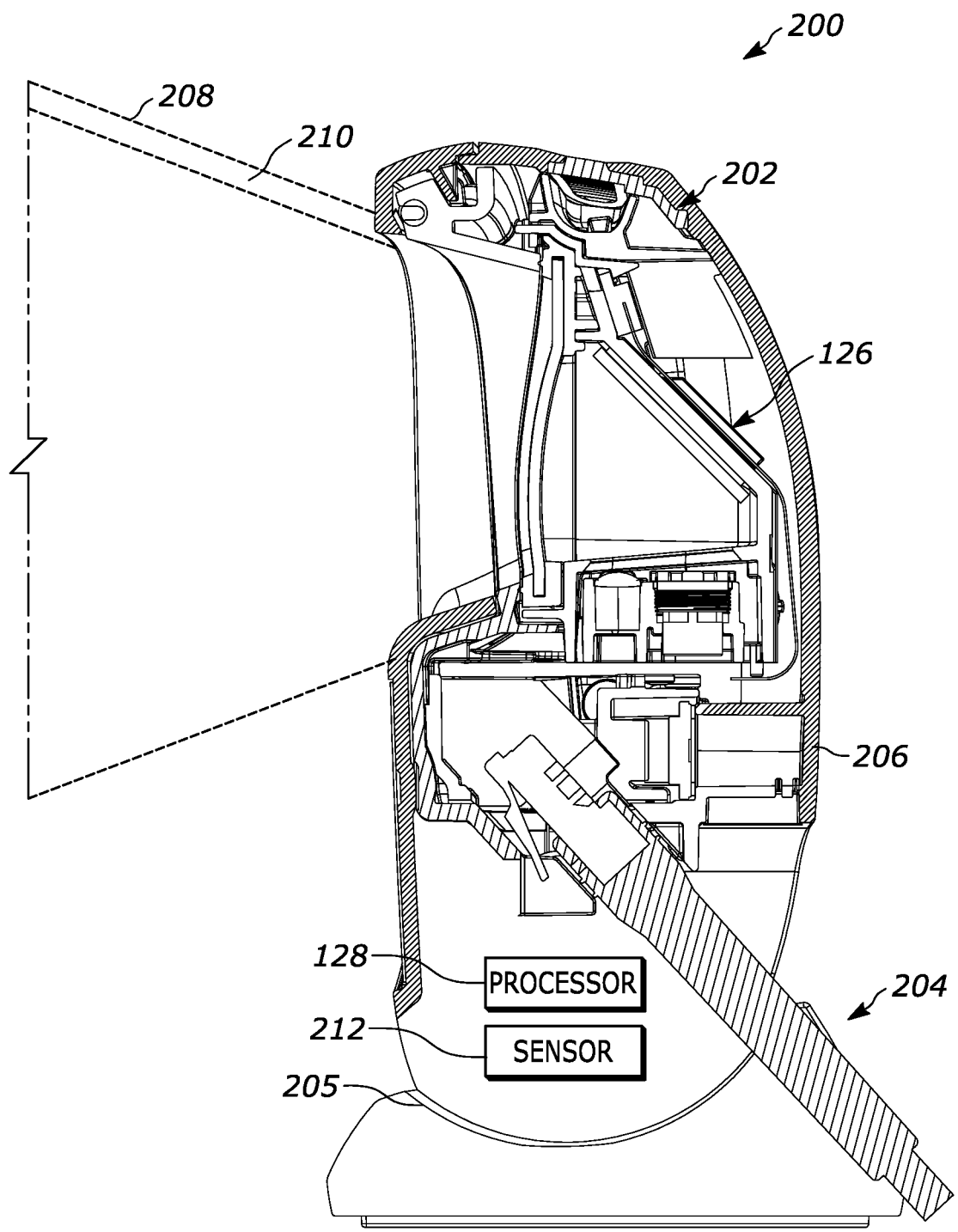
FIG. 4 is a cross-sectional view of a scanning device assembly in accordance with a second disclosed example.

FIG. 4 is a cross-sectional view of a scanning device assembly 200 in accordance with a second disclosed example. The scanning device assembly 200 includes a scanning device 202 and a base 204 adapted to support the scanning device 202 in operation. In the example shown, the scanning device 202 is a hand-held scanning device and the base 204 includes a cradle 205 adapted to receive the scanning device 202.

The scanning device 202 includes a housing 206 and the imaging assembly 126 is at least partially positioned within the housing 206. The imaging assembly 126 may be communicatively coupled to the processor 128.

The imaging assembly 126 has a FOV 208. As with the imaging assembly 126 of the POS system 100 of FIG. 1, the imaging assembly 126 is configured to capture one or more images of the FOV 208 associated with image data. In operation, the processor 128 is configured to process the image data of a portion 210 of the FOV 208 and to cause the imaging assembly 126 to initiate an identification session when a target (the target 134) enters the portion 210 of the FOV 208.

In the example shown, the scanning device 202 carries a sensor 212. The sensor 212 and the processor 128 are electrically and/or communicatively coupled. The sensor 212 may be a magnetic sensor such as, for example, a Hall Effect sensor or a Reed switch. Other sensors may prove suitable. For example, the sensor 212 may be an accelerometer. In other examples, the sensor 212 may not be provided or the sensor 212 may be carried by the base 204.

The sensor 212 may be configured to generate a first signal when the base 204 is supporting the scanning device 202 or when the scanning device 202 is otherwise proximate the base and may be configured to generate a second signal when the base 204 is spaced from the scanning device 202. The sensor 212 may be distal to the base 204 when the scanning device 202 is removed from the cradle 205 of the base 204 by, for example, the clerk 108.

In such an example, the processor 128 may be configured to access the signals generated by the sensor 212 and to cause the scanning device 202 to be in a corresponding operational mode, accordingly. In response to the processor 128 accessing the first signal, the processor 128 is configured to cause the scanning device 202 to be in a first operational mode. In response to the processor 128 accessing the second signal, the processor 128 is configured to cause the scanning device 202 to be in a second operational mode. The first operational mode may be a presentation mode during which the processor 128 initiates an identification session in response to the target entering the portion 210 of the FOV 208. The second operational mode may be a trigger mode during which the processor 128 initiates an identification session in response to the clerk 108 actuating a trigger (or button) of the scanning device 202.

In other examples, the sensor 212 may be adapted to generate a first signal when the scanning device 202 is in a first orientation and to generate a second signal when the scanning device 202 is in a second orientation. The scanning device 202 may be in the first orientation when the scanning device 202 is mounted to a wall. The scanning device 202 may be in the second orientation when the scanning device 202 is positioned on a table. Based on the different orientations of the scanning device 202 and the signals accessed, the processor 128 may change where the portion 210 of the FOV 208 is positioned. For example, the processor 128 may be configured to associate the portion 210 of the FOV 208 with a first side of the FOV 208 in response to the processor 128 accessing the first signal and the processor 128 may be configured to associate the portion 210 of the FOV 208 with a second side of the FOV 208 in response to the processor 128 accessing the second signal. The first side of the FOV 208 may be a top edge of the FOV 208 and the second side of the FOV 208 may be one or more lateral (side) edges of the FOV 208. As an alternative, the processor 128 may be configured to associate the portion 210 of the FOV 208 with the entire FOV 208 in response to the processor 128 accessing the second signal. Other arrangements/configurations may prove suitable.

Figure 5:
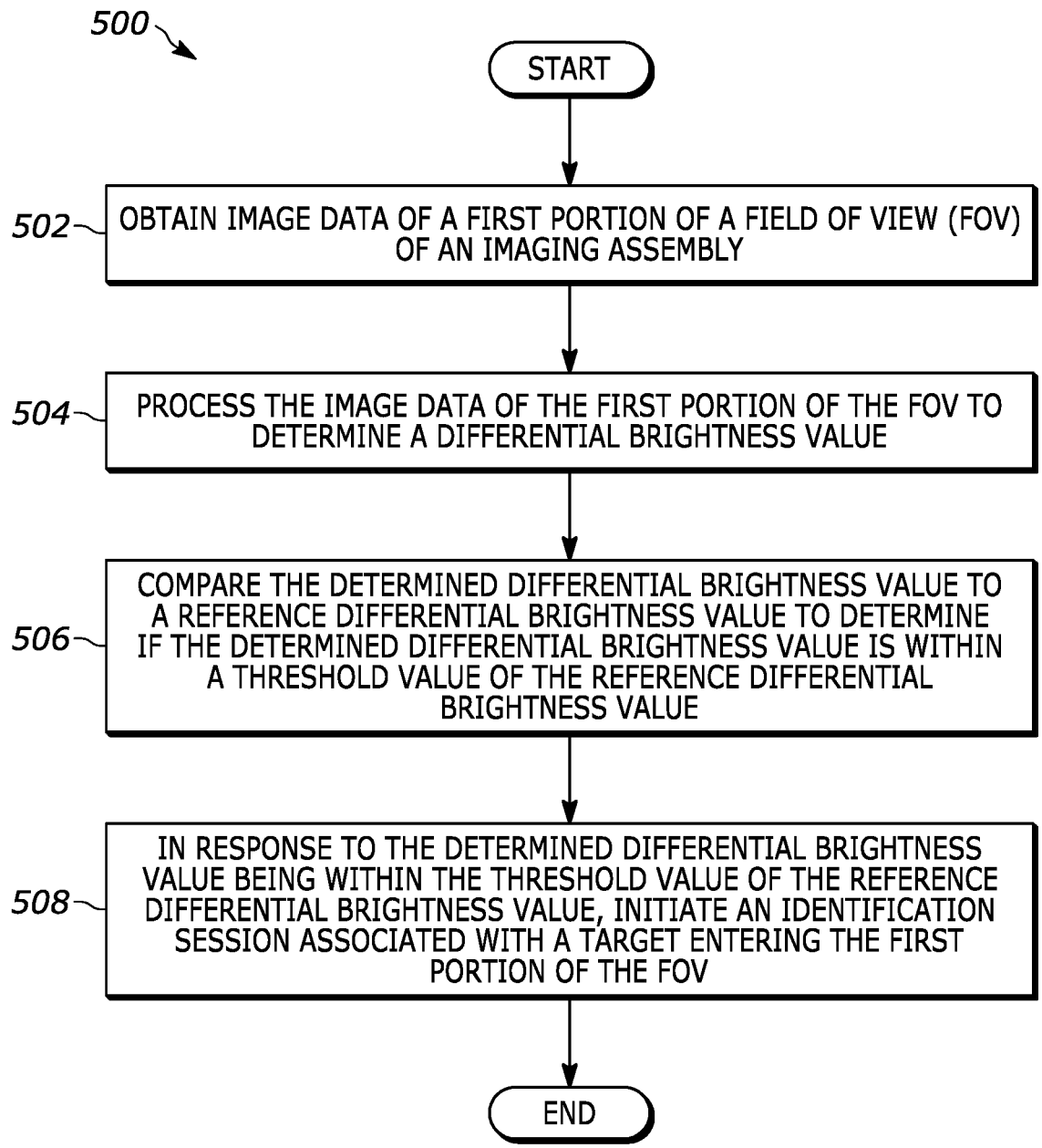
FIG. 5 illustrates a flowchart for a method for performing a method of initiating identification sessions, as implemented by the POS system of FIG. 1 and/or the scanning device assembly of FIG. 4.

FIG. 5 illustrates a flowchart for a method for performing a method of initiating identification sessions, as implemented by the POS system 100 of FIG. 1 and/or the scanning device assembly 200 of FIG. 4. A process 500 begins at block 502 with obtaining image data of the first portion 132 of the FOV 130 of the imaging assembly 126. The FOV 130 includes the first portion 132 and the second portion 133. In some examples, obtaining the image data of the first portion 132 of the FOV 130 includes not obtaining the image data of the second portion 133 of the FOV 130.

The image data of the first portion 132 of the FOV 130 is processed to determine a differential brightness value (block 504). The determined differential brightness value is compared to a reference differential brightness value to determine if the determined differential brightness value is within a threshold value of the reference differential brightness value (block 506). At block 508, the process 500 initiates an identification session associated with the target 134 entering the first portion 132 of the FOV 130 in response to the determined differential brightness value being within the threshold value of the reference differential brightness value. The identification session includes capturing one or more images of the FOV 130. In some examples, the identification session is not initiated when the target 134 enters the second portion 132 of the FOV 130.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode reader comprising:
a housing;
an imaging assembly positioned at least partially within the housing, the imaging assembly having a field of view (FOV) including a first portion of the FOV and a second portion of the FOV, the imaging assembly configured to capture one or more images of the FOV associated with image data; and
a processor communicatively coupled to the imaging assembly, the processor configured to process the image data of the first portion of the FOV and to initiate an identification session when a target enters the first portion of the FOV and configured to not initiate the identification session when the target enters the second portion of the FOV.

2. The barcode reader of claim 1, wherein the processor is configured to process the image data of the first portion of the FOV to determine a differential brightness value, to compare the determined differential brightness value to a reference differential brightness value, and to detect the target entering the first portion of the FOV in response to the determined differential brightness value being within a threshold value of the reference differential brightness value.

3. The barcode reader of claim 1, wherein the processor is configured to compare subsequent image data of the first portion of the FOV to preceding image data of the first portion of the FOV to detect the target entering the first portion of the FOV.

4. The barcode reader of claim 1, wherein the processor is configured to process the image data of the first portion of the FOV to identify contrast within the image data and to identify the target based on the contrast.

5. The barcode reader of claim 1, wherein the first portion of the FOV is centrally positioned within the FOV.

6. The barcode reader of claim 1, wherein the first portion of the FOV is positioned on a side of the FOV and the second portion of the FOV is positioned on an opposing side.

7. The barcode reader of claim 1, wherein the first portion of the FOV is associated with an edge of the FOV.

8. The barcode reader of claim 1, wherein the first portion includes a first sub-portion and a second sub-portion, the first sub-portion is associated with a first edge or zone of the FOV and the second sub-portion is associated with a second edge or zone of the FOV.

9. The barcode reader of claim 1, wherein the barcode reader is a bi-optic scanner having a lower housing and a tower extending generally perpendicular to the lower housing, wherein the imaging assembly is positioned such that the FOV fans out in a generally horizontal direction.

10. The barcode reader of claim 1, wherein the barcode reader is a bi-optic scanner having a lower housing and a tower extending generally perpendicular to the lower housing, wherein the imaging assembly is positioned such that the FOV fans out in a generally vertical direction.

11. The barcode reader of claim 1, wherein the FOV includes a first-sub FOV and a second-sub FOV, the first sub FOV including the first portion.

12. The barcode reader of claim 11, wherein the first portion is on a side of the first-sub FOV and the second portion includes the second-sub FOV and a remainder of the first-sub FOV.

13. The barcode reader of claim 1, wherein the FOV includes a first FOV and a second FOV and wherein the barcode reader is a bi-optic scanner having a lower housing and a tower extending generally perpendicular to the lower housing, wherein the imaging assembly is positioned such that the first FOV fans out in a generally vertical direction and the second FOV fans out in a generally horizontal direction.

14. The barcode reader of claim 13, wherein the first FOV includes a first-sub FOV and a second-sub FOV and the second FOV includes a third-sub FOV and a fourth-sub FOV, the first portion of the FOV being positioned within the first-sub FOV.

15. A scanning device assembly, comprising:
a scanning device, comprising:
a housing;
an imaging assembly positioned at least partially within the housing, the imaging assembly having a field of view (FOV) and configured to capture one or more images of the FOV associated with image data; and
a processor communicatively coupled to the imaging assembly, the processor configured to process the image data of a portion of the FOV and to cause the imaging assembly to initiate an identification session when a target enters the portion of the FOV.

16. The scanning device assembly of claim 15, wherein the processor is configured to determine a differential brightness value of the image data of the portion of the FOV, compare the determined differential brightness value to a reference differential brightness value, and to initiate the identification session when the differential brightness value is within a threshold value of the reference value indicative of the target entering the portion of the FOV.

17. The scanning device assembly of claim 15, wherein the processor is configured to not initiate the identification session when the target enters a second portion of the FOV.

18. The scanning device assembly of claim 15, wherein the scanning device is a bi-optic scanner having a lower tower extending generally perpendicular to the lower housing, wherein the imaging assembly is positioned such that FOV fans out in at least one of a generally horizontal direction and a generally vertical direction.

19. The scanning device assembly of claim 15, wherein the scanning device is a hand-held scanner.

20. The scanning device assembly of claim 19, further comprising a base adapted to support the scanning device during operation.

21. The scanning device assembly of claim 20, further comprising a sensor carried by one of the scanning device and the base and configured to generate a first signal when the base is supporting the scanning device and configured to generate a second signal when the base is spaced from the scanning device, wherein the processor is configured to cause the scanning device to be in a first operational mode in response to the processor accessing the first signal and the processor is configured to cause the scanning device to be in a second operational mode in response to the processor accessing the second signal.

22. The scanning device of claim 15, further comprising a sensor carried by the scanning device and configured to generate a first signal when the scanning device is in a first orientation and to generate a second signal when the scanning device is in a second orientation, wherein the processor is configured to associate the portion of the FOV with a first side of the FOV in response to the processor accessing the first signal and the processor is configured to associate the portion of the FOV with a second side of the FOV in response to the processor accessing the second signal.

23. A method of initiating an identification session of a barcode reader, comprising:
  obtaining image data of a first portion of a field of view (FOV) of an imaging assembly, the FOV including the first portion and a second portion;
  processing the image data of the first portion of the FOV to determine a differential brightness value;
  comparing the determined differential brightness value to a reference differential brightness value to determine if the determined differential brightness value is within a threshold value of the reference differential brightness value; and
  in response to the determined differential brightness value being within the threshold value of the reference differential brightness value, initiating an identification session associated with a target entering the first portion of the FOV, wherein the identification session includes capturing one or more images of the FOV.

24. The method of claim 23, further including not initiating the identification session when the target enters the second portion of the FOV.

25. The method of claim 23, wherein obtaining the image data of the first portion of the FOV includes not obtaining the image data of a second portion of the FOV.

26. The method of claim 23, further comprising causing the barcode reader to be in a presentation mode when the barcode reader is supported by a base and causing the barcode reader to be in a handheld mode when the barcode reader is spaced from the base.

\* \* \* \* \*